United States Patent
Sodano

(10) Patent No.: US 11,659,391 B2
(45) Date of Patent: *May 23, 2023

(54) REAL-TIME AUTHENTICATION USING A MOBILE DEVICE ON A HIGH GENERATION CELLULAR NETWORK

(71) Applicant: Bank of America Corporation, Charlotte, NC (US)

(72) Inventor: Thomas Sodano, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/689,623

(22) Filed: Mar. 8, 2022

(65) Prior Publication Data

US 2022/0191695 A1 Jun. 16, 2022

Related U.S. Application Data

(63) Continuation of application No. 16/520,661, filed on Jul. 24, 2019, now Pat. No. 11,317,280.

(51) Int. Cl.
*H04W 12/06* (2021.01)
*G06Q 20/40* (2012.01)
*G06F 16/29* (2019.01)
*H04W 12/63* (2021.01)

(52) U.S. Cl.
CPC ............ *H04W 12/06* (2013.01); *G06F 16/29* (2019.01); *G06Q 20/40* (2013.01); *H04W 12/63* (2021.01)

(58) Field of Classification Search
CPC ...... H04W 12/06; H04W 12/63; G06Q 20/40; G06F 16/29; G06F 16/909; H04L 67/306
See application file for complete search history.

(56) References Cited

U.S. PATENT DOCUMENTS

| | | | |
|---|---|---|---|
| 9,788,211 B2 | 10/2017 | Zhang | |
| 9,961,624 B1 | 5/2018 | Zait | |
| 10,136,264 B2 | 11/2018 | Scarafia et al. | |
| 10,257,668 B2 | 4/2019 | Shaw et al. | |
| 11,087,309 B2 * | 8/2021 | Hayman | H04L 69/28 |
| 2012/0016091 A1 | 1/2012 | Parent et al. | |

(Continued)

*Primary Examiner* — Sanchit K Sarker
(74) *Attorney, Agent, or Firm* — Banner & Witcoff, Ltd.

(57) ABSTRACT

Aspects of the disclosure relate to methods, systems, and computing platforms for authenticating activity on another computing device in real-time using a mobile device on a high generation cellular network. Aspects of the disclosure leverage and utilize a user's mobile device connected to a high generation cellular network to collect and analyze data about a user to seamlessly identify and prevent potentially fraudulent transactions. More specifically, the present disclosure uses high generation cellular networks, such as a fifth-generation ("5G") cellular network, to seamlessly, frequently, and repeatedly monitor a user through a 5G mobile device to provide a variation on two-factor authentication. Aspects of the disclosure provide effective, efficient, scalable, fast, reliable, and convenient technical solutions that address and overcome the technical problems associated with monitoring and preventing in real-time potential fraudulent transactions without burdening users (e.g., credit card holders, debit card holders, account holders, and others).

18 Claims, 5 Drawing Sheets

(56) References Cited

U.S. PATENT DOCUMENTS

| | | |
|---|---|---|
| 2012/0160912 A1* | 6/2012 | Laracey .............. G06Q 20/3274 |
| | | 235/379 |
| 2013/0012788 A1* | 1/2013 | Horseman .............. G16H 50/30 |
| | | 600/301 |
| 2014/0005269 A1 | 1/2014 | Ngwuluka et al. |
| 2014/0052697 A1* | 2/2014 | Williams .............. G06V 10/98 |
| | | 707/E17.005 |
| 2015/0015463 A1 | 1/2015 | Tan et al. |
| 2015/0154634 A1* | 6/2015 | Chiu .................. G06Q 30/0253 |
| | | 705/14.51 |
| 2016/0032874 A1 | 2/2016 | Choi |
| 2016/0328749 A1* | 11/2016 | Root .................. G06Q 30/0252 |
| 2017/0002453 A1 | 1/2017 | Cordea et al. |
| 2017/0011663 A1 | 1/2017 | Hilmstedt et al. |
| 2017/0024531 A1* | 1/2017 | Malaviya ................ G16H 50/30 |
| 2017/0116635 A1* | 4/2017 | Gantert .............. G06Q 30/0226 |
| 2018/0152910 A1 | 5/2018 | Ryu et al. |
| 2019/0005301 A1 | 1/2019 | Chen et al. |
| 2019/0029512 A1 | 1/2019 | Pulaski et al. |
| 2019/0045477 A1 | 2/2019 | Edge |
| 2019/0053010 A1* | 2/2019 | Edge ..................... H04W 4/029 |
| 2019/0295125 A1* | 9/2019 | Marino .................. G06N 20/00 |
| 2020/0409932 A1* | 12/2020 | Weizman .............. H04L 9/0861 |
| 2021/0002729 A1 | 1/2021 | Luo et al. |
| 2021/0002954 A1 | 1/2021 | Adams et al. |
| 2021/0027295 A1* | 1/2021 | Raquepaw ............ G07F 19/206 |
| 2021/0029540 A1 | 1/2021 | Sodano |

* cited by examiner

REAL-TIME AUTHENTICATION USING A MOBILE DEVICE ON A HIGH GENERATION CELLULAR NETWORK

CROSS-REFERENCE TO RELATED APPLICATIONS

This application is a continuation of U.S. patent application Ser. No. 16/520,661, filed on Jul. 24, 2019, the contents of which is hereby incorporated by reference in its entirety.

TECHNICAL FIELD OF DISCLOSURE

The present disclosure relates to methods, systems, and computing platforms for authenticating activity on another computing device in real-time using a mobile device on a high generation cellular network. More specifically, the present disclosure uses high generation cellular networks, such as a fifth-generation ("5G") cellular network, to seamlessly, frequently, and repeatedly monitor a user through a 5G mobile device to provide enhanced authentication.

BACKGROUND

Ubiquitous availability of mobile devices, such as smart phones and tablets, that are connected to wireless networks has opened up avenues for faster dissemination of information. In some situations, attempts by a large number of devices to access a wireless network may result in a reduced quality of services to all devices. Maintaining connectivity may prove to be critical when attempting to gather and provide information on a real-time and continuous manner. Servicing an ever-increasing number of connected devices has been a constant driver for introduction of newer cellular standards and technologies. Various connectivity enhancements introduced by the fifth generation (5G) communication standards and devices are focused on larger data throughput and/or longer ranges.

In addition, the detection and prevention of nefarious activities involving financial transactions, such as purchases using a stolen credit card at a point-of-sale terminal or a stolen debit card at an ATM machine, is a long-standing problem. While solutions have been put forth to mitigate these risks, many fall short due to one or more drawbacks. For example, some solutions are onerous on the cardholder and have received pushback from users. Others fail to take enough security precautions and are rendered ineffective. Moreover, others require a human being to intervene and track activity, thus being costly and potentially delayed in response time. The disclosure herein addresses one or more shortcoming in the art.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes an authentication server device, including: at least one processor, a communication interface communicatively coupled to the at least one processor, and a memory. The memory may store a user profile corresponding to a user of a user computing device, where the user profile includes at least one value generated by a mobile device of the user including a high generation network communication interface. And the memory may further store computer-readable instructions that, when executed by the at least one processor, cause the authentication server device to perform various steps. For example, the authentication server device may receive a request to approve a transaction, where the request includes supplemental data about the user of the user computing device which was used to submit the transaction. For example, the authentication server device may also determine that the user profile stored in the memory is up-to-date, then match the supplemental data in the request with the user profile stored in the memory. Moreover, the authentication server device may send an approval of the transaction. Other embodiments of this aspect include corresponding computer systems, apparatus, and computer programs recorded on one or more computer storage devices, each configured to perform the actions of the methods.

One general aspect includes a method of authenticating a user of a self-service kiosk using a mobile phone including a high generation network communication interface. The method may include steps to: receive, by a processor of an authentication server device, a request to approve a transaction, where the request includes supplemental data about the user of the self-service kiosk which was used to submit the transaction; determine, by the processor, that a user profile stored in a memory of the authentication server device is up-to-date, where the user profile includes identification of a mobile device of the user; send, by the processor, a command to the mobile device of the user, where the command includes a unique code included in the supplemental data; execute, by the mobile device, the command to cause a short-range wireless communication circuitry in the mobile device to broadcast the unique code to all nearby devices, where the short-range wireless communication circuitry is not the high generation network communication interface; receive, by the self-service kiosk, the broadcasted unique code; match, by the self-service kiosk, the broadcasted unique code with the supplemental data in the request; and approve, by the self-service kiosk, the transaction. Other embodiments of this aspect include corresponding computer systems, apparatus, and computer programs recorded on one or more computer storage devices, each configured to perform the actions of the methods.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
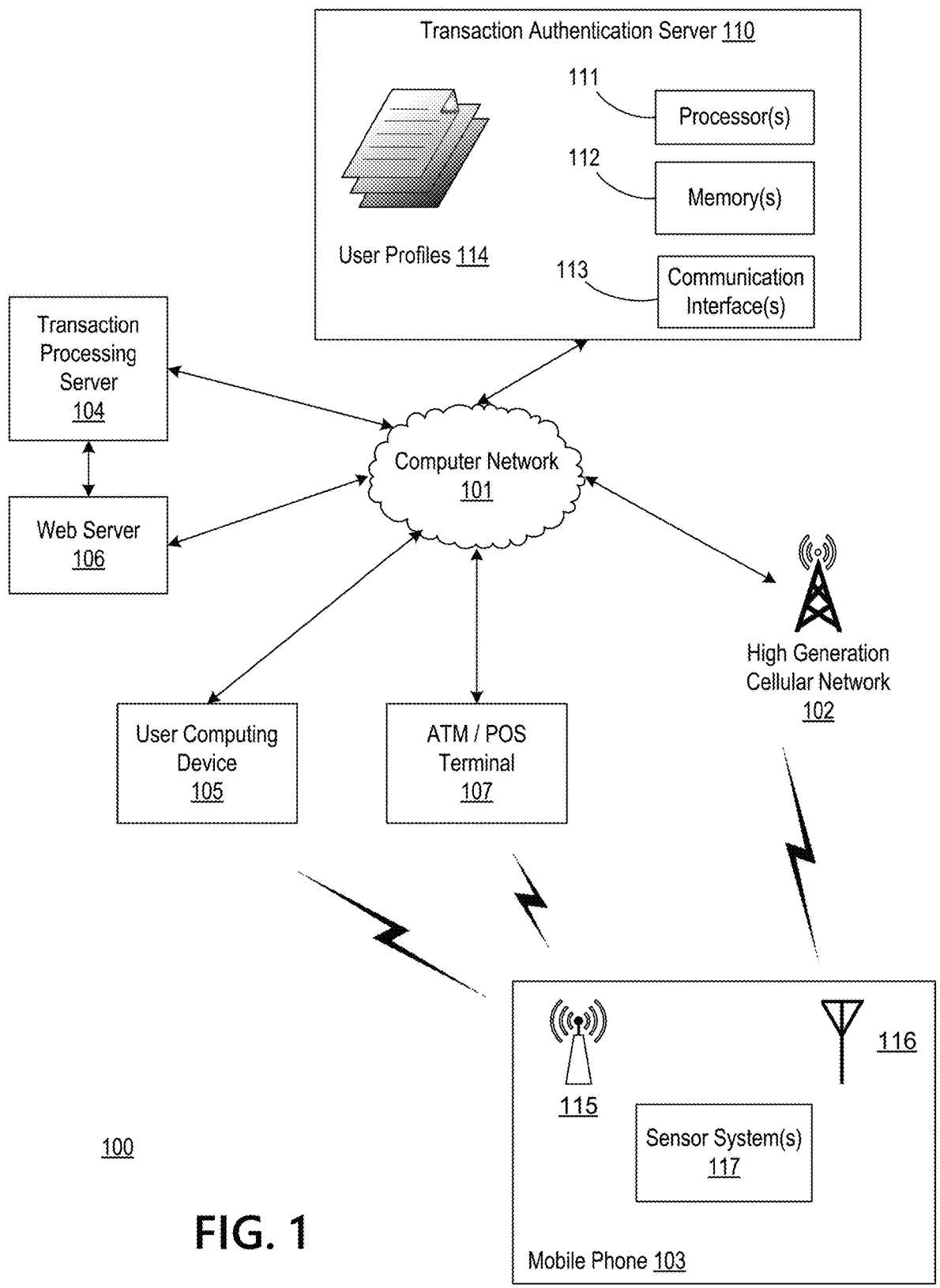
FIG. 1 depicts an illustrative computing environment involving a high generation cellular network in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Moreover, various connections between elements are discussed in the following description, and these connections are general and, unless specified otherwise, may be direct or indirect, wired or wireless, and that the specification is not intended to be limiting in this respect.

Confirming the authenticity of the user requesting the transaction is a bedrock of protection against fraudulent activity—this applies not only to financial transactions, but any online or in-person transaction where a trusted, central transaction authentication server can confirm, through a second, different channel, that the user is actually who they say they are. To this end, the present disclosure relates to methods, systems, and computing platforms for authenticating activity on another computing device in real-time using a mobile device on a high generation cellular network. Aspects of the disclosure leverage and utilize a user's mobile device connected to a high generation cellular network to collect and analyze data about a user to seamlessly identify and prevent potentially fraudulent transactions. More specifically, the present disclosure uses high generation cellular networks, such as a fifth-generation ("5G") cellular network, to seamlessly, frequently, and repeatedly monitor a user through a 5G mobile device to provide a variation on two-factor authentication. Aspects of the disclosure provide effective, efficient, scalable, fast, reliable, and convenient technical solutions that address and overcome the technical problems associated with monitoring and preventing in real-time potential fraudulent transactions without burdening users (e.g., credit card holders, debit card holders, account holders, and others).

Fast data transmission rates, efficient, and reliable handover between transmission towers in cellular networks (e.g., as the mobile device continues to move), availability of bandwidth, accuracy of location data, and availability of multiple simultaneous communication channels are useful in authenticating transactions in real-time. Cellular networks are generally associated with service areas that are subdivided into cells. Location data for devices are based on the cell within which the device is located. Accordingly, smaller cells provide greater accuracy and reliability of location data. High generation cellular networks, such as a fifth-generation ("5G") cellular network, may be configured to considerably reduce the cell size, thereby improving accuracy of location data. Also, for example, in high generation cellular networks, each cell may be equipped with multiple antennas configured to communicate with the device within the cell so that multiple streams of data may be simultaneously transmitted, thereby increasing data transmission rates, reducing backlog due to network traffic, and enhancing speed and accuracy of communications.

Improved location accuracy with 5G networks may be utilized to improve the authentication process for a transaction. 5G network also provide the ability to establish and maintain a reliable communication channel between a mobile computing device and an enterprise server that maintains a user profile corresponding to the mobile computing device and/or its user. Additional benefits of a 5G network, in accordance with various aspects of the disclosure, include but are not limited to high-speed data transmission rates, increased bandwidth, greater location accuracy, and low latency. Therefore, the system disclosed herein may operate with speed and accuracy, while maintaining the integrity, security, and seamlessness of the underlying functionality.

Moreover, 5G standards allow a higher throughput than prior wireless cellular technologies that use $4^{th}$ generation (4G) standards, $3^{rd}$ generation (3G) standards, and the like. A higher throughput may allow a larger number of wireless devices to maintain communication over a wireless network. When a large number of wireless devices may attempt communication over the wireless network, the transmission of one or messages using 5G communication standards may result in lower probability of network congestion for better emergency response and/or disaster management. In addition, some embodiments of 5G communication standards may use a lower frequency transmission channel. A lower frequency channel may result in longer ranges and better penetration through objects. Transmission of one or messages using 5G communication standards may result in a broader coverage area and robust signal quality.

FIG. 1 depicts an illustrative computing environment involving a high generation cellular network in accordance with one or more example embodiments. Computing environment 100 may include one or more computer systems. For example, computing environment 100 may include a transaction authentication server 110, transaction processing server 104, web server 106, user computing device 105 (e.g., a laptop, a desktop, a tablet, a smart television, or other electronic purchasing device), automated teller machine/point-of-sale terminal 107, mobile phone 103, and other computing devices. The computer systems may be communicatively coupled over one or more of a computer network 101 and/or a high generation cellular network 102.

Figure 3:
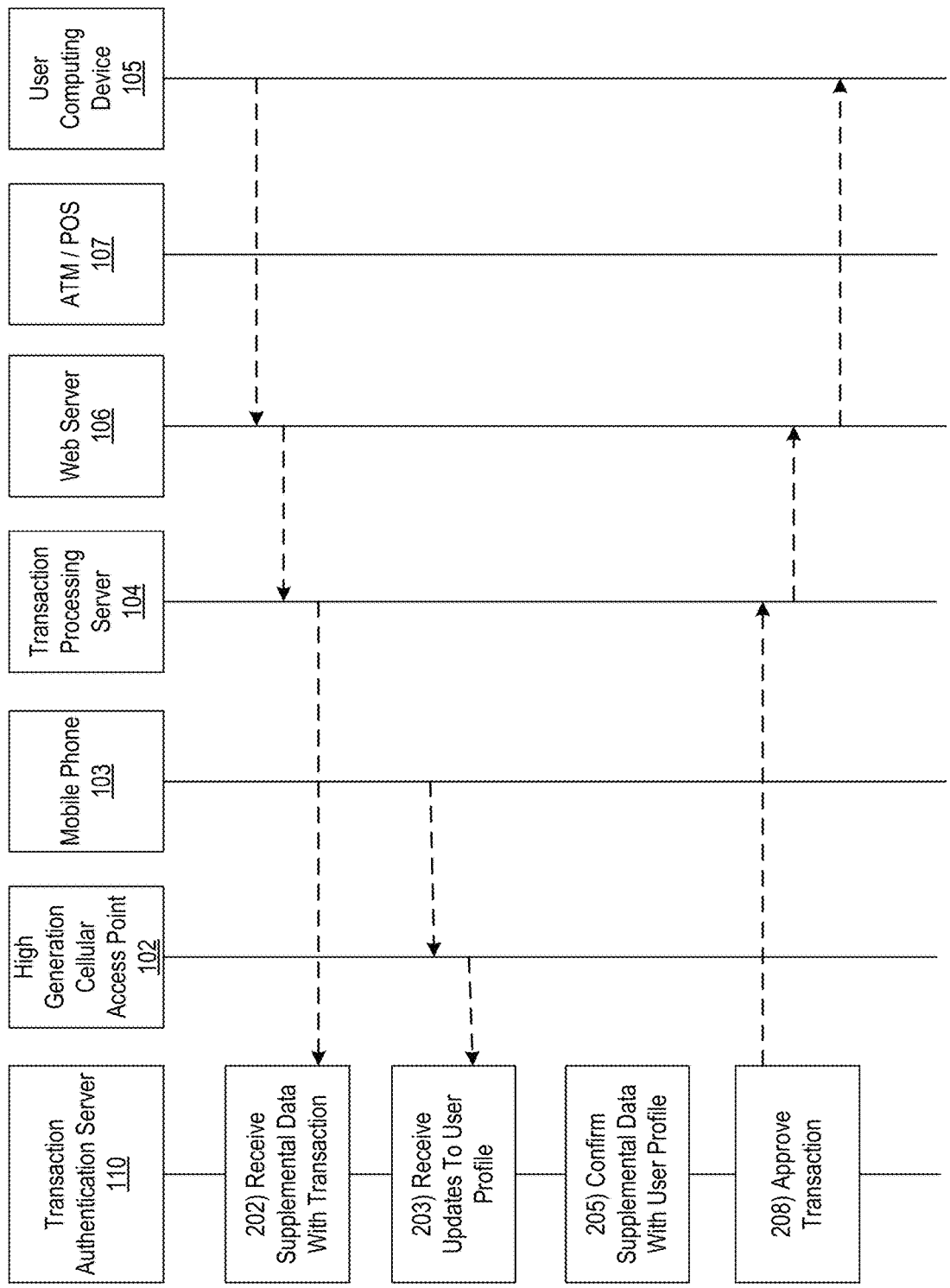
FIG. 3 depicts an illustrative timing diagram showing various interactions between a processing server, an authentication server, and mobile phone on a high generation cellular network, in accordance with one or more example embodiments.
Figure 4:
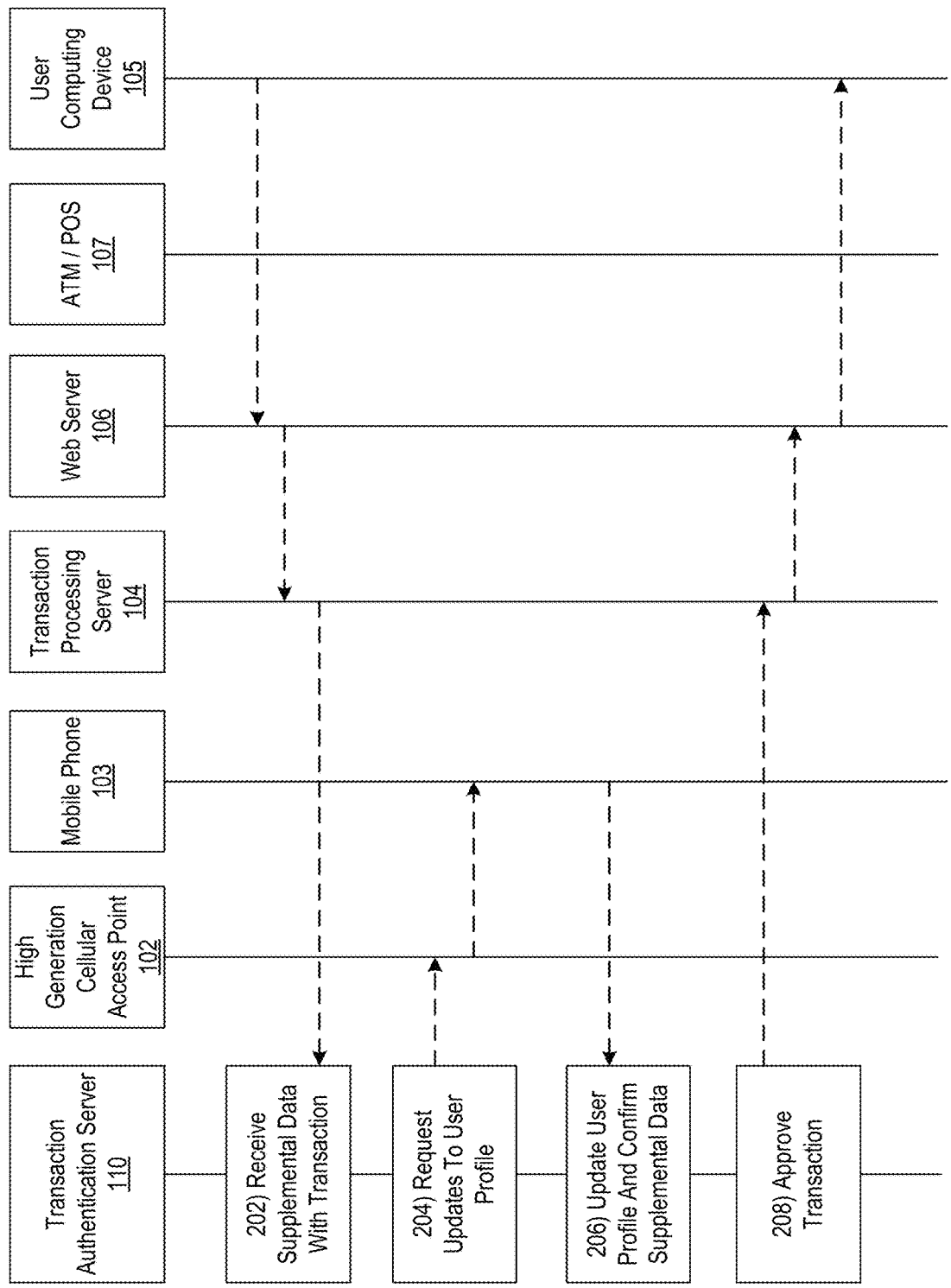
FIG. 4 depicts an illustrative timing diagram showing even more interactions between a processing server, an authentication server, and mobile phone on a high generation cellular network, in accordance with one or more example embodiments.
Figure 5:
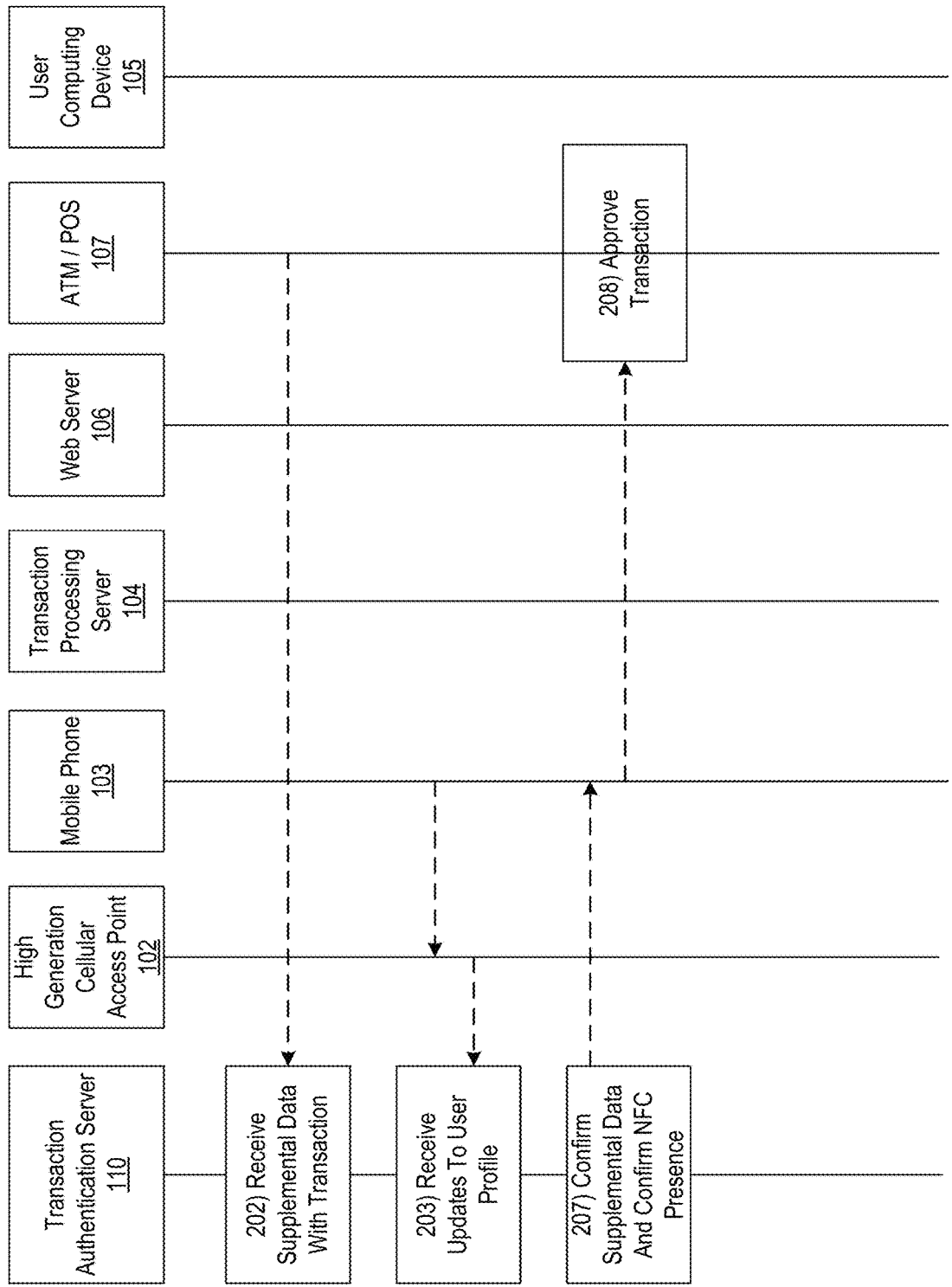
FIG. 5 depicts an illustrative timing diagram showing various interactions between an ATM device, various other devices, and a high generation cellular network, in accordance with one or more example embodiments.

In one example, the transaction authentication server device 110 may comprise at least one processor 111, a memory 112, and a communication interface 113 communicatively coupled to the at least one processor. The memory 112 may store a user profile 114 corresponding to a user of the user computing device 105. The memory 112 may further store computer-readable instructions that, when executed by the at least one processor 111, cause the authentication server device 110 to perform various steps, as illustrated in FIG. 3, FIG. 4, FIG. 5, which are described herein.

The user profile stored in the memory 112 at the transaction authentication server 110 may include at least one value generated by a user's mobile device 103, which includes a high generation network communication interface. An example of such a mobile device 103 may be a 5G-compatible smart phone. The smart phone may communicate over a high generation network communication interface 116 of the mobile device 103. The mobile phone 103 may have installed one or more mobile software applications that permit the mobile phone 103 to collect measurements through its sensor system at any time—a form of "always on" privilege. In other embodiments, the functionality described herein may be integrated into a hardware circuity on the mobile phone 103.

Examples of at least one value generated by a user's mobile device 103 that may be saved in the user profile 114 includes, but is not limited to a geographic location of the mobile device. The geographic location may be longitude and latitude coordinates. Or, it may be a zipcode or a city, or any other value that indicates a discrete geographic position. In some examples, the geographic location may be a bounded geographic area within which the mobile device is located.

In another example, the user's mobile device 103 may use one or more sensor systems 117 to measure values that are then stored in a user profile. For example, the sensor system 117 may measure whether the mobile device is on the person, if it is in a moving vehicle, and other motion-related states. The sensor system 117 may include one or more of an accelerometer, a GPS unit, other location detection circuitry, a gyroscope, and other sensors. The measured sensor data may be saved at the mobile device 103 then transferred via a high generation cellular network 102 or other network 101 to the transaction authentication server 110. The mobile device 103 may include, but is not limited to, a mobile phone, smart phone, tablet, wearable device, or other computing device.

Figure 2:
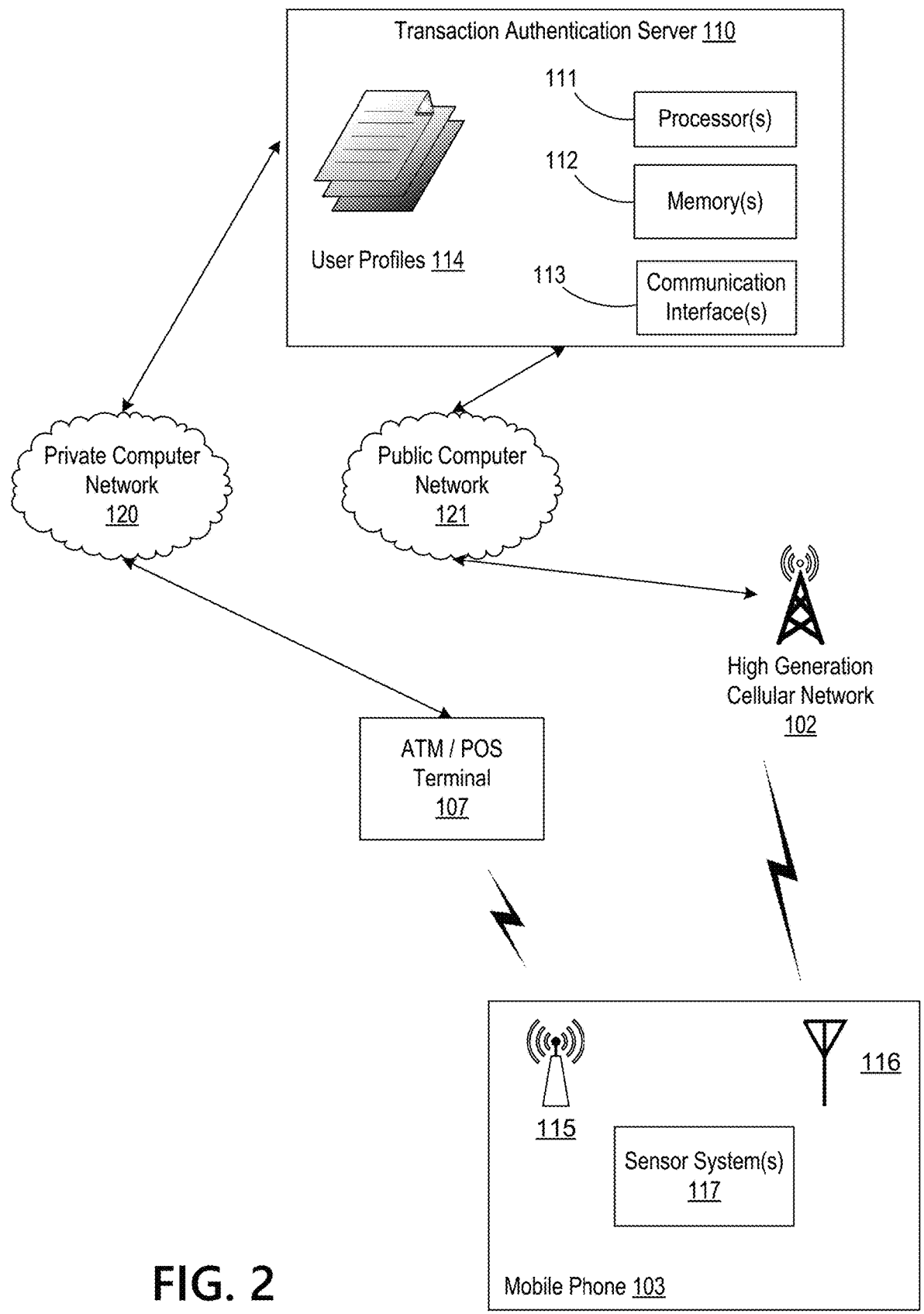
FIG. 2 depicts an illustrative computing environment involving an ATM device with short-range wireless communication capabilities with a mobile phone on a high generation cellular network, in accordance with one or more example embodiments.

FIG. 2 depicts an illustrative computing environment involving an ATM device with short-range wireless communication capabilities with a mobile phone on a high generation cellular network, in accordance with one or more example embodiments. In some examples, the computing environment may include a public computer network 121 (e.g., the Internet) and a private computer network 120 for communications between the various computing devices in the computing environment. For example, an ATM 107 may communicate over a private network 120 with an authentication server 110. The private network 120 may be encrypted and/or a dedicated line restricted to communications only between the authentication server 110 and its network of ATMs 107 and other secure, trusted devices. Meanwhile, a user's mobile phone 103 may communicate over a public computer network 121, such as the Internet, with the authentication server 110. The communication may be encrypted when communicated over the public network 121. In particular, in some examples, the mobile phone 103 may communicate over a short-range wireless communication interface 115 (e.g., Bluetooth, NFC, Wi-Fi IEEE 802.11b, or other non-long range communication protocol) with an ATM 107. Although not shown in FIG. 2, other computing devices may also communicate over the networks 120, 121. For example, a transaction authentication server 110, transaction processing server 104, web server 106, user computing device 105 (e.g., a laptop, a desktop, a tablet, a smart television, or other electronic purchasing device), mobile phone 103, and other computing devices may communicate over the private and public networks as appropriate.

Regarding FIG. 3, in one example, the authentication server device may receive (in step 202, FIG. 3) a request to approve a transaction allegedly submitted with the authorization of a user at a user computing device 105. In some examples the request may come directly from the user computing device 105 to the authentication server 110. However, in other examples, the request may be sent through a web server 106, such as that of an online retailer/store, and then through an optional transaction processing server 104 to the authentication server 110, as illustrated in FIG. 3.

The request received by the authentication server device 110 may include supplemental data, including data about the user computing device 105 and more specifically, the user of the user computing device. For example, the supplemental data may include a geographic location of the user computing device 105. The geographic location may be a zipcode of the user computing device, or may be a city, or other discrete geographic identification of the location of the user computing device. For example, the geographic location may a bounded geographic area within which the user computing device 105 is located. In some examples, the geographic location may be determined through a reverse geographic lookup of the IP address associated with the user computing device. In other examples, the user computing device 105 may include a GPS or location determination unit to provide this information. In yet other examples, the supplemental data may include the MAC address of the user computing device 105, IP address of the device 105, or other uniquely identifiable information about the user computing device 105 at the time when the transaction was submitted for authentication.

At step 203 in FIG. 3, the transaction authentication server 110 receives the user profile from the mobile phone 103 over a high generation cellular network. In some examples, if an existing user profile 114 is already stored in the memory 112, the mobile phone 103 may send only incremental updates to the user profile. In such an embodiment, the mobile phone 103 maintains a timestamp record of the last time an updated user profile was transmitted to the authentication server 110. In one example, the mobile phone 103 automatically transmits updates of the user profile to the server 110 at regular intervals of time, thus updating the user profile in substantially real-time. In another example, the mobile phone 103 transmits updates of the user profile to the server 110 upon trigger events. One example of a triggering event may be when the mobile phone 103 detects through its sensor system 117 (or other components) that the state of the mobile phone 103 has changed such that the user profile stored on the server 110 is no longer representative of the user. One example may be when the mobile phone 103 detects through a GPS component in the sensory system 117 that the mobile phone 103 has moved from one geographical location to another geographic location. Another example may include when the sensor system 117 determines that the user has changed from on-the-person to in-motion to in-a-moving-vehicle. Numerous others examples of state changes will be apparent to a person having ordinary skill in the art after review of the entirety disclosed herein.

At step 205 in FIG. 3, with the user profile 114 stored in the memory 112 of the authentication server 110 having been confirmed to be up-to-date, the processor 111 confirms that the supplemental data from the request matches the corresponding data in the user profile. For example, the server device 110 may compare the first geographic location identified in the supplemental data to a second geographic location measured by the mobile device of the user and stored in the server memory 112 in the user profile. The processor 111 of the authentication server 110, upon confirmation that the two values match, then approves the transaction in step 208 in FIG. 3. The server device 110 acknowledges the match by transmitting, in some examples, an approval of the transaction. The approval may be a message to the user computing device 105. In some examples, the message may travel through one or more intermediary systems to ensure protectivity. Other embodiments of this aspect include corresponding computer systems, apparatus, and computer programs recorded on one or more computer storage devices, each configured to perform the actions of the methods.

FIG. 4 depicts an illustrative timing diagram showing even more interactions between a processing server, an authentication server, and mobile phone on a high generation cellular network, in accordance with one or more example embodiments. Before the authentication server 110 checks the authenticity of the user's transaction, it may confirm that the user profile 114 stored in its memory 112 is up-to-date.

In step 204 in FIG. 4, the authentication server 110 may send a request to the user's mobile phone 103 over a 5G network access point 102 to update the user profile 114 stored at the server. Upon receipt of the request, the mobile phone 103 may return an acknowledgment stating the time-stamp or other information of the last update it provided to the server 110. If the time-stamp matches the time-stamp saved in the user profile in memory 112 at the server 110, then the server 110 is confirmed that the user profile 114 is up-to-date. In other words, the authentication server device 110 may determine that the user profile 114 stored in the memory 112 is up-to-date by establishing a data connection between its communication interface 113 and the high generation network communication interface 116 of the mobile device of the user. Then the server 110 may update substantially in real-time the user profile 114 stored in the memory 112 with sensor data received over the data connection. In one example, the updating substantially in real-time occurs nearly simultaneously with a submission of the user's transaction at the user computing device 105. In one example, the server device 110 may affirmatively send a request, to the high generation network communication interface 116 of the mobile device 103 of the user, to request the mobile device 103 to send updates of the user profile. Upon receipt of the updates, in step 206 in FIG. 4, the processor 111 of the server 110 updates the user profile 114 stored in memory 112.

As explained herein, the data connection is over a high generation network 102 to permit a continuous and/or near real-time responsiveness to the transaction awaiting approval at the user computing device 105. For example, a user having submitted a transaction authorization to purchase an item may not wish to wait more than a normal amount of time to obtain approval for the transaction. The high bandwidth and responsiveness of a high generation network 102 mean that when a large quantity of sensor data is measured by a sensor system 117 of the mobile device 103 and then transmitted to the server 110, then the data communication channel is not delayed. As a result, the nearly real-time responsiveness of the transaction authentication server 110 is not compromised.

FIG. 5 depicts an illustrative timing diagram showing various interactions between an ATM device, various other devices, and a high generation cellular network, in accordance with one or more example embodiments. In particular, FIG. 5 shows one method of authenticating a user of a self-service kiosk using a mobile phone 103 including a high generation network communication interface 116. A self-service kiosk, such as an automated teller machine (ATM) or a point-of-sale (POS) terminal, as illustrated in FIG. 2, may be the source of a new transaction—e.g., an electronic cash register 107 at a retail location intaking credit card information and transmitting it to a financial institute or credit card processing entity for authorization. The processor 111 of the transaction authentication server 110 may receive a request to approve a transaction.

In step 202 in FIG. 5, the POS terminal 107 may transmit the request for authentication to a transaction authentication server 110. The request includes supplemental data with information, as explained herein, about the POS terminal 107 and/or the user (e.g., purchaser) being serviced at the location of the POS terminal. In another example, the request may include supplemental data about the user of the self-service kiosk, which was used to submit the transaction. Assuming as discussed in FIG. 3 and FIG. 4, that the user profile 114 stored at the transaction authentication server 110 is determined by the processor 111 to be up-to-date, the processor 111 of the server 110 may confirm that the user profile matches the supplemental data in the request. For example, whether or not the supplemental data includes correct identification of the mobile device 103 of the user.

Next, in step 207 in FIG. 5, the processor 111 of the authentication server 110 may send a command to the mobile device 103 of the user. In one example, the command may include a unique code provided to the server 110 as part of the supplemental data in the request. The unique code can be any alphanumeric, binary, or other sequence of bits suitable for the functionality described herein. The server 110 may transmit the unique code to the mobile device 103 for execution by the mobile device 103. In one example, the command may cause a short-range wireless communication circuitry 115 in the mobile device 103 to broadcast the unique code to all nearby devices. The short-range wireless communication circuitry is not the high generation network communication interface 116 because in contrast, the short-range wireless communication circuitry is designed for limited range, wireless transmissions. For example, the short-range wireless communication circuitry 115 may comprise a Bluetooth chip that wirelessly broadcasts the unique code to all devices in its short-range proximity. Conversely, the self-service kiosk, e.g., POS terminal 107, awaiting authorization of the transaction receives the broadcasted unique code from the mobile device 103. The POS terminal 107 may receive the unique code through its wireless circuitry that is listening for a broadcast signal from other devices in its proximity. The POS terminal 107 may match the received, broadcasted unique code with the supplemental data that it sent in the request to the authentication server 110. If the two codes match, the POS terminal 107 may approve the transaction as having been authenticated by the authentication server 110 because the nearby mobile device 103 would not have been able to present the specific unique code absent having been provided by the transaction authentication server 110 to the actual user. Other embodiments of this aspect include corresponding computer systems, apparatus, and computer programs recorded on one or more computer storage devices, each configured to perform the actions of the methods.

In some embodiments, the computing devices described herein may be equipped with radio capabilities, a global positioning system ("GPS"), and/or a transceiver equipped to send and receive communication data. Also, for example, the computing device may be equipped with networking capabilities such as for Wireless Fidelity ("Wi-Fi") networks, and/or for local networks configured for device-to-device communications.

In some embodiments, authenticating the user may be based on one or more of biometric identifiers associated with the user. For example, server 110 may authenticate the user based on fingerprint data, facial recognition data, retina scanning data, and/or voice recognition data associated with an authorized user of the computing device (e.g., computing device 110). In some embodiments, authentication server 110 may authenticate the user based on a comparison of received biometric identifiers with previously stored biometric identifiers associated with the user. For example, the user interface may include a touch sensitive display that is configured for fingerprint detection. As another example, the user interface may include a camera that is configured to capture facial expressions, and/or configured for retinal scanning. The server 110 may utilize such biometric identifiers alone or in combination to determine a unique biometric signature for a user, and then utilize this biometric signature to authenticate transactions originating from a user computing device 105.

In several embodiments, authenticating the transaction of a user may be based on a location data of the user computing device 105, wherein the location data is based on a high generation cellular network. Cellular networks are generally associated with service areas that are subdivided into cells. Location data for devices are based on the cell within which the device is located. Accordingly, smaller cells provide greater accuracy and reliability of location data. High generation cellular networks, such as a 5G cellular network, may be configured to considerably reduce the cell size, thereby improving accuracy of location data. Accurate location data may be utilized to authenticate the user. For example, mobile phone 103 may utilize location accuracy to determine that the user is associated with a vehicle, and that such vehicle is at user's home, or in a parking garage at a place of employment of the user. The authentication server 110 may use such location data alone or in combination to determine a unique location signature for a user, and then use this location signature to authenticate a computing device 105.

Location data may be retrieved from a variety of sources, such as, for example, from a satellite-based navigation system such as a global positioning system ("GPS"), known locations of cellular towers, and Wireless Fidelity ("Wi-Fi") networks. The authentication server 110 may analyze the location data to determine distances of the devices from the computing device 105, and identify whether a particular user is proximate to the computing device. For example, authentication server 110 may apply distance measurement techniques to determine distances between devices (e.g., triangulation techniques to locate nodes within a network), and identify that a particular mobile device is proximate to the computing device 106.

Also, for example, authentication server 110 may update, based on location data, movement patterns corresponding to one or more devices proximate to the computing device 105. In some embodiments, server 110 may update a device movement pattern corresponding to one or more devices, and store such a pattern in a database. For instance, an authentication server 110 may update, based on location data, a movement pattern corresponding to the computing device 105 to indicate movement of the computing device 105. For example, transaction authentication server 110 may monitor progress of the mobile phone 107 along a path of daily commute. For example, transaction authentication server 110 may detect when the mobile phone 107 leaves home, the traffic route taken, any stops, and when the mobile phone 107 arrives at its destination (e.g., office). Additionally or alternatively, transaction authentication server 110 through measurement taken by the mobile phone 107 (e.g., sensor system 117, Bluetooth transceiver 115) may detect arrival and/or departure of proximate devices. As devices move, the movement patterns may, for instance, map where the devices have been and where they are going; in addition, transaction authentication server 110 may record the device movement patterns, and store the patterns in the data store (e.g., memory 112). Thus, transaction authentication server 110 may map the movement of devices, as well as relative distances between devices as they move. This information may be used to seamlessly identify and prevent potentially fraudulent transactions.

In some embodiments, a second communication channel may be established between the authentication server 110 and a trusted device 107 associated with the user. For example, transaction authentication server 110 may utilize location data and/or data from a local network to determine whether one or more devices 107 are proximate to the computing device (e.g., computing device 105). In authenticating the computing device (e.g., computing device 105), authentication server 110 may identify whether the device 107 is proximate to the computing device (e.g., computing device 105), and transaction authentication server 110 may access the data store (e.g., memory 112) to confirm that the identified device is in the repository (e.g., memory 112) of trusted devices. Transaction authentication server 110 may then authenticate the computing device (e.g., computing device 105) based on the proximity of the trusted device 107 using the short-range wireless communication interface 115 of the trusted device 107. The short-range wireless communication interface 115 confirms whether the computing device 105 is proximate.

In some embodiments, transaction authentication server 110 may use location data and/or data from a local network to determine that the user carrying a mobile device 107 is alone in a vehicle, or at a personal space (e.g., home, office). In another example, transaction authentication server 110 may utilize location data and/or data from a local network to determine that the user is at a public space (e.g., a café, restaurant, shopping center, at or near a point of sales location, and so forth), and may more quickly authenticate the user's request for a transaction from those public spaces, while preventing quick authentication from distant places.

Accordingly, the techniques described herein leverage properties of a high generation cellular network to enable real-time transactions to be performed effectively. Based on several factors, time may be of the essence, and it may be critical to authenticate or block a transaction's approval within a very short time window from when the user (or its proxy) provides the request. The techniques described herein are based on near-real time authentication of events and exchange of data and communications between devices over multiple communication channels. Such activities are enabled by at least the high bandwidth, low latency, high data transmission rates, and/or location accuracies associated with evolving high generation cellular networks 102 that may optionally be configured for seamless communications with local networks, and/or other networks (e.g., private network 120, public network 121).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An authentication server device, comprising:
at least one processor;
a communication interface communicatively coupled to the at least one processor; and
a memory storing a user profile corresponding to a user of a user computing device, wherein the user profile comprises at least one value generated by a mobile device of the user comprising a high generation network communication interface,
the memory further stores computer-readable instructions that, when executed by the at least one processor, cause the authentication server device to:
receive, from the user computing device, a request to approve a transaction, wherein the request includes supplemental data corresponding to the user of the user computing device;
update, substantially in real-time, the user profile stored in the memory with sensor data, wherein:
the sensor data is measured by a sensor system of the mobile device,
the sensor data is sent, by the mobile device, via the high generation network communication interface,
the updating occurs nearly simultaneously with a submission of the transaction at the user computing device, and
the updating comprises determining that the user profile stored in the memory is up-to-date, wherein the determining that the user profile stored in the memory is up-to-date is based on a timestamp corresponding to a transmission, by the mobile device, of latest sensor data measured by the sensor system; and
send, based on the supplemental data in the request matching with the user profile stored in the memory, an approval of the transaction.

2. The authentication server device of claim 1, wherein the sensor data comprises user biometric data of the user.

3. The authentication server device of claim 1, wherein the sensor data comprises a geographic location of the mobile device.

4. The authentication server device of claim 1, wherein the supplemental data comprises a geographic location of the user computing device.

5. The authentication server device of claim 1, wherein the instructions when executed by the at least one processor cause the updating by causing:
 establishing a data connection between the communication interface of the authentication server device and the high generation network communication interface of the mobile device of the user, wherein the data connection is over a high generation network; and
 using the sensor data received via the data connection to update the user profile in real-time.

6. The authentication server device of claim 5, wherein the high generation network is a fifth-generation (5G) cellular network.

7. The authentication server device of claim 1, wherein the instructions when executed by the at least one processor cause the authentication server device to:
 send a request, to the high generation network communication interface of the mobile device of the user, for updates to the user profile stored in the memory, wherein the mobile device is communicatively coupled to the authentication server device over a high generation network.

8. The authentication server device of claim 1, wherein the user computing device is a self-service kiosk, and wherein the instructions when executed by the at least one processor cause the sending the approval of the transaction by causing:
 sending a command to the mobile device of the user, wherein the mobile device is identified in the user profile stored in memory, wherein the command comprises a unique code included in the supplemental data;
 wherein the command, when executed by the mobile device, causes a short-range wireless communication circuitry in the mobile device to broadcast the unique code to all nearby devices, wherein the short-range wireless communication circuitry is not the high generation network communication interface; and
 wherein the self-service kiosk, in response to receiving the broadcasted unique code, approves the transaction.

9. The server device of claim 1, wherein the user computing device comprises an automated teller machine.

10. The server device of claim 1, wherein the user computing device comprises a networked electronic cash register.

11. A method comprising:
 receiving, from a user computing device, a request to approve a transaction, wherein the request includes supplemental data corresponding to a user of the user computing device;
 updating substantially in real-time a stored user profile, associated with the user, with sensor data, wherein:
  the sensor data is measured by a sensor system of a mobile device associated with the user,
  the sensor data is sent, by the mobile device, via a high generation network communication interface of the mobile device,
  the updating occurs nearly simultaneously with a submission of the transaction at the user computing device, and
  the updating comprises determining that the user profile stored in memory is up-to-date, wherein the determining that the user profile stored in the memory is up-to-date is based on a timestamp corresponding to a transmission, by the mobile device, of latest sensor data measured by the sensor system; and
 sending, based on the supplemental data in the request matching with the user profile stored in the memory, an approval of the transaction.

12. The method of claim 11, wherein the sensor data comprises user biometric data of the user.

13. The method of claim 11, wherein the sensor data comprises a geographic location of the mobile device.

14. The method of claim 11, wherein the supplemental data comprises a geographic location of the user computing device.

15. The method of claim 11, wherein the updating comprises:
 establishing a data connection with the high generation network communication interface of the mobile device of the user, wherein the data connection is over a high generation network; and
 using the sensor data received via the data connection to update the user profile in real-time.

16. The method of claim 15, wherein the high generation network is a fifth-generation (5G) cellular network.

17. The method of claim 11, further comprising:
 sending a request, to the high generation network communication interface of the mobile device of the user, for updates to the user profile stored in the memory, wherein the mobile device connected via a high generation network.

18. One or more non-transitory computer-readable media storing instructions that, when executed, cause:
 receiving, from a user computing device, a request to approve a transaction, wherein the request includes supplemental data corresponding to a user of the user computing device;
 updating substantially in real-time a stored user profile, associated with the user, with sensor data, wherein:
  the sensor data is measured by a sensor system of a mobile device associated with the user,
  the sensor data is sent, by the mobile device, via a high generation network communication interface of the mobile device,
  the updating occurs nearly simultaneously with a submission of the transaction at the user computing device, and
  the updating comprises determining that the user profile stored in memory is up-to-date, wherein the determining that the user profile stored in the memory is up-to-date is based on a timestamp corresponding to a transmission, by the mobile device, of latest sensor data measured by the sensor system; and
 sending, based on the supplemental data in the request matching with the user profile stored in the memory, an approval of the transaction.

* * * * *